United States Patent Office 3,354,078
Patented Nov. 21, 1967

3,354,078
CATALYTIC CONVERSION WITH A CRYSTAL-
LINE ALUMINOSILICATE ACTIVATED WITH
A METALLIC HALIDE
Joseph N. Miale, Trenton, N.J., and Paul B. Weisz, Media,
Pa., assignors to Mobil Oil Corporation, a corporation
of New York
No Drawing. Filed Feb. 4, 1965, Ser. No. 430,451
21 Claims. (Cl. 208—120)

This invention relates to a process for catalytically transforming certain classes of organic compounds in the presence of a unique catalyst, the activity of which is unexpectedly enhanced or promoted upon contact with a volatile activating compound. More particularly, the present invention is concerned with a method wherein an organic charge undergoes catalytic conversion in the presence of a volatile metal halide and a catalyst consisting essentially of specified crystalline aluminosilicates.

It has heretofore been reported that various chemical reactions may be advantageously carried out by contact catalysis utilizing as catalysts crystalline aluminosilicate zeolites having rigid three-dimensional networks made up of unit cells characterized by the substantial absence of change in unit cell dimensions upon dehydration and rehydration and a homogeneous highly uniform pore structure. The above requirements are fulfilled by certain crystalline zeolites known as molecular sieves. The reactions effectively catalyzed by such materials include, by way of example, hydrocarbon cracking, alkylation, dealkylation, disproportionation, isomerization and polymerization.

The ability of the above catalysts to influence and to direct the course of chemical conversion entails an unusual degree of desirable catalytic selectivity. Briefly, two types of selectivity are involved: first geometrical selectivity, which depends on the relationship between the diameter of the pores in the crystal structure of the aluminosilicate zeolite and the diameter of the reactant and product molecules and second, intrinsic catalytic selectivity, which depends on the choice of cations present on the internal surface of the crystalline aluminosilicate.

In accordance with the present invention, it has now been discovered that the catalytic characteristics of the above-indicated crystalline aluminosilicates are enhanced and advantageously promoted when catalytic transformation is carried out in the presence of such materials, which have undergone contact prior to completion of the desired transformation with a volatile metal halide. Thus, it has been found that treatment of the crystalline aluminosilicate catalyst with the volatile compound may be carried out as a pretreating step, or alternatively that the volatile compound may be introduced into the reaction zone simultaneously with the charge stock or subsequent to introduction of the charge stock but prior to completion of the desired catalytic transformation. Thus, it has been found that the presence in the reaction zone of a volatile metal halide increases the rate of a catalytic conversion reaction, such as paraffin cracking, with certain crystalline aluminosilicates under conditions for which catalytic activity already exists. Thus, with the present invention, it has been discovered that the presence of a readily available volatile metal halide, such as aluminum chloride, unexpectedly enhances the catalytic activity and utility of the crsytalline aluminosilicate zeolites having silica to alumina mole ratios above 1.8, generally in the range of 1.8 to 12.

In one embodiment, the present invention provides a method for effecting transformation of organic compounds, catalytically convertible in the presence of acidic catalyst sites, by contacting the same under conversion conditions with a catalyst of a crystalline aluminosilicate comprising cations selected from the group consisting of hydrogen and hydrogen precursor ions which catalyst has undergone contact prior to completion of said transformation reaction with a volatile metal halide.

In another embodiment, the invention affords a method for cracking a hydrocarbon charge in the presence of a volatile metal halide and the above crystalline aluminosilicate catalyst.

The aluminosilicates employed as catalysts in the process of this invention are essentially dehydrated forms of crystalline siliceous zeolites, base-exchanged with cations selected from the group consisting of hydrogen and hydrogen precursor ions, and having a silica to alumina mole ratio of at least 1.8. At least a substantial portion of the alkali metal and alkaline earth metal ions normally contained in the zeolitic structure must be replaced with the hydrogen or hydrogen precursor cations. The atoms of alkali metal, alkaline earth metal or cations in replacement thereof, silicon, aluminum and oxygen are arranged in a definite and consistent crystalline pattern. Such structure contains a large number of small cavities, interconnected by a number of still smaller channels. These cavities and channels are precisely uniform in size. The interstitial dimensions of openings in the crystal lattice limit the size and shape of the molecules that can enter the interior of the aluminosilicate and it is such characteristic of many crystalline zeolites that has led to their designation as "molecular sieves."

Zeolites having the above characteristics include both natural and synthetic materials, for example, chabazite, gmelinite, mordenite, manalite, leucite, stilbite and erionite. Synthetic zeolites may be of the X-type, Y-type, T-type, L-type, W-type or other well known form of molecular sieve, having a silica to alumina mole ratio of at least 1.8, including ZK zeolites such as those described in copending application Ser. No. 134,841 filed Aug. 30, 1961, now Patent No. 3,314,752, and zeolites B, D, E, H, J, K-G, M, Q, R and S. Preparation of the above type zeolites is well known, having been described in the literature, for example, X-type zeolite in U.S. Patent No. 2,882,244; Y-type zeolite in U.S. Patent No. 3,130,-007; and T-type zeolite in U.S. Patent No. 2,950,952. As initially prepared, the metal of the alumino-silicate is an alkali metal and usually sodium. Such alkali metal is subject to base-exchange with a wide variety of other ions and, for the purposes of the present invention, are base-exchanged with hydrogen or hydrogen precursor ions. The molecular sieve materials so obtained are unusually porous, the pores having highly uniform molecular dimensions, generally between about 3 and 15 angstrom units in diameter. Each crystal of molecular sieve material contains laterally billions of tiny cavities or cages interconnected by channels of unvarying diameter. The size, valence and portion of the metal ions in the crystal control the effective diameter of the interconnecting channels.

The alkali metal generally contained in the naturally occurring or synthetically prepared zeolites described above must be replaced partially or completely by other cations selected from the group consisting of hydrogen and hydrogen precursor ions. Suitable replacing ions including hydrogen or ammonium ions, for example, sodium may be replaced with hydrogen or ammonium ions. The hydrogen ion may be added in the form of a mineral or organic acid such as hydrochloric nitric, sulfuric or formic acid and the like, under conditions such that the structure of the crystalline aluminosilicate is not adversely affected. The hydrogen precursor, which upon heating undergoes thermal degradation to hydrogen, may be an organic or inorganic ammonium compound, generally an inorganic ammonium salt. Cations forming compounds with halogens or hydrohalogens, which compounds are volatile at about 150 to 1400° F., including titanium, gallium and iron may also be suitable for the method of the present invention. However, the hydrogen and hydrogen presursor ions are preferred cations of the crystalline aluminosilicates of the present invention.

Replacement is suitably accomplished by contacting the initially formed crystalline aluminosilicate with a solution of an ionizable compound of the ion which is to be zeolitically introduced into the molecular seive structure for a period of time sufficient to bring about the extent of desired ion exchange. After such treatment, the ion-exchanged product is water washed, dried and calcined. The extent to which exchange takes place can be controlled. The aluminosilicate undergoing activation in accordance with the present invention comprise cations selected from the group consisting of hydrogen and hydrogen precursor ions. Aluminosilicates not containing such cations, with the exception of cations forming volatile halogen or hydrohalogen compounds above described, apparently do not respond to activation with the volatile metal halides described herein. While the aluminosilicate employed may have been treated to effect only partial replacement with hydrogen or ammonium ions, the aluminosilicate undergoing activation must contain at least some of the essential cations enumerated above. Such materials are designated herein as suitable crystalline aluminosilicates.

The suitable aluminosilicate may be employed directly as a catalyst or it may be combined with a support or binder. The particular chemical composition of the latter is not critical. It is, however, necessary that the support or binder employed be thermally stable under the conditions at which the conversion reaction is carried out. Thus, it is contemplated that solid porous adsorbents, carriers and supports of the type heretofore employed in catalytic operations may feasibly be used in combination with the crystalline aluminosilicate. Such materials may be catalytically inert or may possess an intrinsic cathalytic activity or an activity attributable to close association or reaction with the crystalline aluminosilicate. Such materials include by way of examples, dried inorganic oxide gels and gelatinous precipitates of alumina, silica, zirconia, magnesia, thoria, titania, boria and combinations of these oxides with one another and with other components. Other suitable supports include activated charcoal, mullite, kieselguhr, bauxite, silicon carbide, sintered alumina and various clays. Also, the alumino-silicate may be intimately composited with a suitable binder, such as inorganic-oxide hydrogel or clay, for example by ball milling the two materials together, preferably in the presence of water, under conditions to reduce the particle size of the aluminosilicate to a weight mean particle diameter of less than 40 microns and preferably less than 15 microns. Also, the aluminosilicate may be combined with and distributed throughout a gel matrix by dispersing the aluminosilicate in powdered form in an inorganic oxide hydrosol. In accordance with this procedure, the finely divided aluminosilicate may be dispersed in an already prepared hydrosol or, as is preferable, where the hydrosol is characterized by a short time of gelation, the finely divided aluminosilicate may be added to one or more of the reactants used in forming the hydrosol or may be admixed in the form of a separate stream with streams of the hydrosol-forming reactants in a mixing nozzle or other means where the reactants are brought into intimate contact. The powder-containing inorganic oxide hydrosol sets to a hydrogel may thereafter, if desired, be base exchanged to introduce selected cations into the aluminosilicate and then dried and calcined.

The inorganic oxide gel employed, as described above, as a matrix for the suitable aluminosilicate may be a gel of any hydrous inorganic oxide, such as, for example, aluminous or siliceous gels. While alumina gel or silica gel may be suitably utilized as a matrix, it is preferred that the inorganic oxide gel employed be a cogel of silica and an oxide of at least one metal selected from the group consisting of metals of Groups II–A, III–A and IV–B of the Periodic Table. As employed herein, the Periodic Table referse to the standard long form, Webster's Third New International Dictionary, G. & C. Merriam Co., (Springfield, Mass. 1961) p. 1680.

Such components include for example, silica-alumina, silica - magnesia, silica - zirconia, silica - thoria, silica-beryllia, silica-titania as well as ternary combinations such as silica-alumina-thoria, silica-alumina-zirconia, silica-alumina-magnesia and silica-magnesia-zirconia. In the foregoing gels, silica is generally present as the major component and the other oxides of metals are present in minor proportion. Thus, the silica content of such gels is generally within the approximate range of 55 to 100 weight percent with the other metal oxide content ranging from zero to 45 weight percent. The inorganic oxide hydrogels utilized herein and hydrogels obtained therefrom may be prepared by any method known in the art, such as for example, hydrolysis of ethyl ortho silicate, acidification of an alkali metal silicate and a salt of a metal, the oxide of which it is desired to cogel with silica, etc. The relative proportions of finely divided crystalline aluminosilicate and inorganic oxide gel matrix may vary widely with the crystalline aluminosilicate content ranging from about 2 to about 90 percent by weight and more usually, particularly where the composite is prepared in the form of beads, in the range of about 5 to about 50 percent by weight of the composite.

The catalyst of aluminosilicate employed in the present process is preferably used in the form of small fragments of a size best suited for operation under the specific conditions existing. Thus, the catalyst may be in the form of a finely divided powder or may be in the form of pellets of 1/16" or 1/8" size, for example, obtained upon pelleting the crystalline aluminosilicate with or without a suitable binder such as clay, colloidal graphite, etc. Likewise, the suitable aluminosilicate dispersed in a gel matrix or supported on a porous support of the type described above may be utilized in any desired physical form. For example, hydrogel containing added crystalline aluminosilicate powder may be permitted to set in mass to a hydrogel which is thereafter dried and broken into pieces of desired size. The pieces of gel so obtained are generally of irregular shape. Uniformly shaped pieces of gel may be obtained by extrusion or pelleting of the aluminosilicate-containing hydrogel. Also, the hydrosol may be introduced into the perforations of a perforated plate and retained therein until the sol has set to a hydrogel, after which the formed hydrogel pieces are removed from the plate. A particularly feasible method is to prepare the catalyst in the form of spheroidal particles by dispersing the powdered aluminosilicate in a hydrosol and introducing globules of the resulting hydrosol into a body of water-immiscible liquid, for example, an oil medium wherein the globules of hydrosol set to a hydrogel and subsequently pass into an underlying layer of water from which they are sluiced to further processing operations such as base-exchange, water-washing, drying and calcining. Larger size spheres are ordinarily within the range of from about 1/64 to about 1/4 inch in diameter, whereas smaller size spheres, which are generally referred to as microspheres, are within the range of from about 10 to about 100 microns in diameter. The use of the spheroidally shaped particles is of particular advantage in hydrocarbon conversion processes in which the catalyst is subjected to continuous movement, such as the compact moving bed process, the fluidized process, etc. As applied to the stationary bed, spheroidal catalyst particles provide effective contact between the reactants and the catalyst by avoiding channeling.

While, for the production of spheroidal catalyst particles by the aforementioned technique, initial formation of a hydrosol which sets upon lapse of a short interval of time to an all-embracing bead-form hydrogel is essential, it is also feasible to employ, particularly where the catalyst is prepared in a form other than the spheroidal shape, a matrix comprising a gelatinous hydrous oxide precipitate with varying degrees of hydration or mixture of a hydrogel and such gelatinous precipitate. The term gel, as utilized herein, is intended to include hydrogel, gelatinous precipitates and mixtures of the two. Also, the matrix may consist of or contain, as a component thereof, a clay and particularly a clay of the montmorillionite or kaolinite families, either raw or acid treated. Other suitable materials for use as the matrix of the present catalyst composition include charcoal, graphite, bauxite and other binders compatible with the suitable crystalline aluminosilicate and thermally stable under the temperature conditions at which the catalyst is used.

The volatile metal halide utilized in the present process for activating the above-described suitable aluminosilicate catalysts may be either aluminum chloride, ferric chloride, antimony chloride, bismuth chloride, gallium chloride, titanium chloride, zirconium chloride and the like, their bromides or iodides, or mixtures thereof. In the present method aluminum chloride is the most effective activator and is therefore preferred. Fluoride compounds generally are suitable only in an anhydrous atmosphere, and for activation of aluminosilicates other than those containing hydrogen or hydrogen precursor ions, since hydrogen fluoride dissolves silica and thus destroys any crystalline aluminosilicate. It is also within the purview of the invention to employ a material which undergoes decomposition to or formation of a volatile metal halide at the temperature of contact with the catalyst. Such volatile metal halide precursors include $H_2SnCl_6 \cdot 6H_2O$, $Fe(NH_4)_3Cl_6$ and $AlCl_3 \cdot 6NH_3$.

Contact of the suitable aluminosilicate catalyst with the volatile metal halide may be conducted as a pretreating step before bringing the catalyst into contact with the organic charge. Alternatively, the volatile activating compound may be introduced simultaneously with the charge gas to contact with the crystalline aluminosilicate catalyst, or the volatile metal halide may be introduced into the reaction zone after contact between the charge stream and the aluminosilicate catalyst has been carried out for a predetermined interval of time. Also, in some instances, it may be desirable to introduce periodically the volatile metal halide into the reaction zone while the charge gas is fed continuously thereto. The aluminosilicate catalyst may also be given a periodic treatment with the volatile metal halide while out of contact with the charge gas, for example after periodic regeneration of the catalyst, but prior to replacing the regenerated catalyst on stream. It will be understood that the various above means for contacting the catalyst and activating compound do not necessarily afford equivalent or comparable results. It is, however, essential that contact between the catalyst and volatile activating compound be made prior to substantial completion of the conversion reaction under consideration.

Alternatively, the volatile metal halide may be added by sublimation to the crystalline aluminosilicate catalyst. The activating component, in the solid form, may be milled with the catalyst particles or added by impregnation with the component in a suitable solvent; in which cases the activation is achieved by volatilization of the solid compound at an elevated temperature. In many cases the charge stream to the catalyst may serve as the suitable solvent.

The amount of the volatile metal halide utilized in any instance is sufficient effectively to enhance the activity of the aluminosilicate catalyst. The particular amount required to attain the desired promoting effect will vary depending on the specific catalyst employed, the nature of the catalytic process involved and the particular volatile compound utilized for activation. Generally, however, the activating compound will be brought into contact with the catalyst in an amount corresponding to between about 0.05 and about 25 percent by weight based on the catalyst with a flowing gas of larger total volume. In continuous operations, a rate of feed of the volatile metal halide of about 1 percent to about 200 percent by weight per hour based on the catalyst will generally be employed, although in some instances amounts as small as or even smaller than 0.1 weight percent per hour may be used. Generally, the catalyst to charge stock volume ratio employed in carrying out the reactions contemplated by the present invention is within the approximate range of 0.02 to 10. Although a continuous feed of activating compound has been found to be most effective, particularly in continuous process operations, there are reactions in which transient contact produces a fairly long period of activation. In such cases, it is feasible to treat the catalyst intermittently with the activating compound rather than with a continuous stream. In processes operated on a batch basis the supply of volatile metal halide may comprise part of the charge.

While the volatile metal halide employed will generally be contacted, as such, directly with the catalyst either in the absence or presence of the charge stock, it is contemplated that such volatile compound may also be produced in situ during the course of the catalytic reaction. The use of a volatile metal halide as an activator for the catalyst has the further advantage of emerging from the reaction zone along with the products and being capable of easy separation therefrom. Thus, the activating compound emerging with any gaseous products may be removed, for example, by contacting the gases with the suitable sorbent such as a solution of caustic soda or soda ash. If desired or necessary, however, liquid product may be substantially freed of the activating compound by heating or by washing the product with a suitable sorbent therefore such as a solution of caustic soda.

Although the effectiveness of activation of the crystalline aluminosilicate catalyst with a volatile metal halide, as described herein, may be observed with different specified ionic forms of the above-described crystalline aluminosilicates, the greatest increase in activation has been observed with the hydrogen- and hydrogen precursor-containing aluminosilicates. As employed herein, the terms "hydrogen- and hydrogen precursor-containing crystalline aluminosilicates" shall refer to aluminosilicates containing substantially, but not necessarily completely, hydrogen or hydrogen precursor cations and mixtures thereof. A very marked effect of the activating compound has been realized with hydrogen- and ammonium-containing crystalline aluminosilicates having uniform pore openings in the range of 5 to 15 angstroms. It has been established that after contact with a volatile metal halide such materials are activated to a level of catalytic effectiveness which is greatly above that achieved with the use of the untreated catalyst. Thus, it has been found that the crystalline aluminosilicate catalysts which have undergone treatment with a volatile metal halide possess catalytic activities many times the activities of the same catalysts which have not been so treated. It has been observed that certain crystalline aluminosilicates, of low catalytic activity due to the inability of reactants to penetrate their 3 to 5 angstrom unit pores are activated with certain activators, and similar crystalline aluminosilicates may also be activated by treatment with a volatile metal halide according to the method of the present invention.

For certain of the crystalline aluminosilicates, it has been observed that the catalyst retains increased activity after being subjected to treatment with the volatile metal halide and subsequently removed from contact with such compound. For these aluminosilicates, initial contacting with the activating compound may be followed by operation without continuous treatment. For example, the activating contact can be practiced as a pretreating operation or as a periodic treatment. The latter method of operation is particularly applicable as part of a cyclic operation, i.e., after regeneration of the catalyst and prior to catalytic conversion.

The reactions promoted by the activating compounds with the crystalline aluminosilicate zeolites described herein involve conversion of certain classes of organic compounds, including cracking of paraffinic, olefinic, aromatic and naphthenic hydrocarbons as well as mixtures thereof, for example petroleum fractions, such as those boiling in the gas oil range; disproportionation of aromatics; dehydration of alcohols to olefins and ethers; hydration of olefins to alcohols; isomerization and polymerization of olefins; isomerization of terpenes; alkylation and dealkylation of aromatic hydrocarbons.

The cracking of hydrocarbons, and particularly normal hydrocarbons having a carbon chain of from 5 to 30 carbon atoms, represents an especially advantageous use of the activated crystalline aluminosilicate catalysts since the nature of the products may be well controlled. The catalyst in such process may be used as pellets in a fixed bed operation, in a compact moving bed operation or in a fluidized operation. The general operating conditions cover a wide range because of the wide utility of the catalysts. In cracking paraffins for the production of olefins, it is generally desirable to carry out such process at atmospheric pressure, employing a temperature in the approximate range of 700 to 1200° F. and preferably 800 to 1000° F. The liquid hourly space velocity of the charge may range from 0.2 to 40, preferably from 0.5 to 20. The paraffins that may be charged range from $C_5$ to $C_{30}$ paraffins and mixtures thereof. Generally, the conversion of charge improves with increasing molecular weight, so that for hexane cracking, for example, the low ranges of space velocity and higher temperatures are desirable for satisfactory conversion. The cracking of other crackable hydrocarbons including aromatics containing alkyl chains, naphthenes and olefins is likewise advantageously carried out with the hereinabove-described catalysts which have undergone treatment with the specified volatile metal halide.

Catalytic cracking with the activated crystalline aluminosilicate catalysts described herein may be carried out by contacting a crackable hydrocarbon charge at catalytic cracking conditions employing a temperature within the approximate range of 500 to 1100° F. and under a pressure ranging from subatmospheric up to several hundred atmospheres. The contact time of the hydrocarbon charge with the catalyst is adjusted in any case according to the conditions, the particular charge stock and the particular results desired to give a substantial amount of cracking to lower boiling products.

Thus, as illustrative of the usefulness of this invention, it has been established that paraffinic hydrocarbons may be cracked over the activated crystalline aluminosilicate catalysts to afford a high yield of olefins. The latter are particularly desirable products since they are susceptible to a wide variety of useful applications. They may be employed, for example, in the formation of high octane alkylate; they also may be used for alkylation of benzene to form cumene and other alkyl benzenes; or they may be polymerized to liquid fuels or to form plastics such as polyethylene and polypropylene. In many instances, these desirable olefin products may be formed in high yields by cracking low-valued petroleum charge stocks, such as paraffinic materials in the $C_6$–$C_{10}$ range.

Disproportionation of aromatic hydrocarbons utilizing the activated crystalline aluminosilicate catalysts described herein is carried out by contacting a charge of an alkyl aromatic at a temperature of between about 600 and about 1100° F. Under such conditions, for example, toluene is effectively converted into benzene and xylenes.

Dehydration of alcohols utilizing the activated crystalline aluminosilicate catalyst described herein is carried out by contacting a charge of either normal or isoalcohols at a temperature of between about 200° F. and about 650° F. Normal alcohols can, under such conditions, be effectively dehydrated to ethers, while isoalcohols are ordinarily dehydrated to olefins.

Isomerization of olefins utilizing the activated crystalline aluminosilicate catalysts described herein is generally carried out at a temperature of between about 30° F. and about 900° F.

In addition to cracking, dehydration and disproportionation, it is contemplated that activation may be used with the above-described crystalline aluminosilicate catalysts in various other reactions in which organic compounds undergo chemical conversion or transformation into useful products in the presence of acidic catalytic sites. Thus, the isomerization of cycloolefins, such as terpenes, and alkylcyclopentanes; the polymerization of olefins and vinylaromatic compounds and the alkylation and dealkylation of aromatics are all reactions which normally are catalyzed by acidic catalysts. The promotion of such reactions over the crystalline aluminosilicate catalysts referred to herein is thus logically to be included within the scope of the present invention.

The following examples are presented in order to illustrate the method of the present invention without limiting the same.

Example 1

A sample of hydrogen Y crystalline aluminosilicate (HY) was prepared by calcining ammonium Y crystalline aluminosilicate at 1022° F. for 18 hours. A sample of the catalyst was tested according to a standard procedure for the catalytic conversion of n-hexane, as follows: A stream of helium is bubbled through liquid n-hexane to vaporize the charge, giving a vapor pressure of 153 mm. of n-hexane in the charge stream. Contact of the catalyst and charge was carried out at atmospheric pressure in a small heated reactor containing 1½ cc. of catalyst at a temperature between about 500 and 1000° F. (specified for each example), utilizing a residence time of 9 seconds. The effluent product stream was analyzed by vapor chromatography.

Example 2

A 2 ml. sample of the hydrogen Y crystalline aluminosilicate of Example 1 was purged with helium at 700° F. for 30 minutes. The sample was then cooled to 500° F. in helium and treated with aluminum chloride, and placed in a reactor with 0.5 gram of anhydrous aluminum chloride. The reactor was heated to 400–500° F. for 30 minutes to sublime the aluminum chloride. The off gas contained hydrogen chloride and unreacted aluminum chloride. The activated catalyst was then purged with helium at 1000° F. and evaluated for hexane conversion according to the method of Example 1 at 500° F.

Example 3

A sample of hydrogen mordenite (HM) was dried in helium at 1000° F. and tested for conversion of hexane according to the standard procedure of Example 1 at 500 and 400° F.

Example 4

A sample of the hydrogen mordenite of Example 3 was dried for 18 hours in helium at 1000° F. The dried hydrogen mordenite was cooled in a desiccator and then contacted with a solution of aluminum chloride etherate for 30 minutes. During the contact hydrogen chloride fumes were evolved. The excess etherate solution was filtered off and the catalyst was dried in a vacuum desiccator for 64 hours. The catalyst was then heated to 1000° F. for one hour to complete the activation and to remove unreacted aluminum chloride by sublimation. A sample of the activated hydrogen mordenite was tested for conversion of hexane according to the standard procedure of Example 1 at 500 and 400° F.

Example 5

A weathered sample of hydrogen Y crystalline aluminosilicate as used in Example 1, having been aged for about 12 months, was dried overnight at 1000° F., cooled and activated with aluminum chloride etherate according to the procedure of Example 4. The catalyst was then tested for hexane conversion according to the standard procedure of Example 1 at 500° F.

Example 6

A sample of ammonium Y crystalline aluminosilicate was dried in helium for 20 minutes at 900° F., cooled to 500° F. and treated for 90 minutes with $TiCl_4$ evaporated from a warm bubbler by a 10 ml./min. stream of helium. The catalyst was cooled and tested for hexane conversion according to the standard procedure of Example 1 at 600° F.

Example 7

A 1.5 ml. sample of ammonium Y crystalline aluminosilicate was dried in helium for 15 minutes at 1000° F. and cooled to 620° F. ($FeCl_3$ sublimes at ~608° F.) A 1 ml. portion of $FeCl_3$ was sublimed and carried by a helium stream through the catalyst bed. There was considerable HCl in the effluent stream. The catalyst was then tested for hexane conversion according to the standard procedure of Example 1 at 500° F. after use and regeneration.

The results of the hexane conversion procedures for the catalysts of Examples 1–7 are presented below in Table I.

TABLE I.—N-HEXANE CONVERSION

| Example | Catalyst | ° F. | Weight Percent $C_1$–$C_5$ | Weight Percent Iso-$C_6$ | Cracking Activity |
|---|---|---|---|---|---|
| 1 | HY | 700 | 89.5 | 3.3 | 2,000 |
| 1 | HY Regen* | 500 | 5.1 | 4.5 | 6,400 |
| 2 | HY-AlCl₃ Regen* | 500 | 28.0 | 16.4 | 37,000 |
| 3 | HM Regen* | 500 | 99.4 | 0 | 100,000 |
| 3 | HM Regen* | 400 | 88.1 | 3.1 | $10^6$ |
| 4 | HM-AlCl₃ Regen* | 500 | 99.6 | 0.2 | 100,000 |
| 4 | HM-AlCl₃ Regen* | 400 | 47.6 | 10.2 | 9×10⁵ |
| 5 | Aged HY-AlCl₃ Regen* | 500 | 17.0 | 19.4 | 23,000 |
| 6 | NH₄Y-TiCl₄ | 600 | 45.5 | 12.1 | 5,100 |
| 7 | NH₄Y-FeCl₃ | 500 | 34.4 | 14.5 | 45,000 |

*Indicates the catalyst had been regenerated in air at about 1,000° F.

Catalytic cracking activity is indicated by the weight percent conversion of hexane to lower boiling $C_1$–$C_5$ hydrocarbons, while isomerization activity is indicated by weight percent conversion to hexane isomerization. Cracking activity is also indicated quantitatively by the term alpha ($\alpha$) which is an approximate indication of the catalytic cracking activity of the catalyst compared to a standard catalyst. $\alpha$ is the relative rate constant (rate of n-hexane conversion per unit volume of oxides composition per unit time). It is based on the activity of highly active silica alumina cracking catalyst taken as $\alpha=1$. (12.5% cracking at 5 min. on stream under conditions outlined in Example 1.)

The above examples clearly show the improvement in cracking and isomerization activities of hydrogen aluminosilicates by the addition of aluminum chloride, either by sublimation or by impregnation from solution followed by sublimation. All of the aluminum chloride-activated catalysts (Examples 2, 4 and 5) demonstrate improved isomerization activity. Examples 2, 4 and 5 demonstrate the promotion of cracking activity with aluminum chloride. An examination of Examples 3 and 6 demonstrates a substantial equivalency for catalyst activation by either the sublimation or the impregnation-sublimation methods of activation. Examples 6 and 7 demonstrate activation with titanium chloride and iron chloride, respectively.

Example 8

A sample HY-AlCl₃ catalyst prepared according to the method of Example 3 was analyzed and was of the following composition:

| | Wt. percent |
|---|---|
| Silica | 67.3 |
| Alumina | 29.7 |
| Chloride | 1.8 |

(After ignition.)

According to the above composition, it would seem to follow that by the activation of the method of the present invention one aluminum atom has been added to the crystalline aluminosilicate for each two aluminum atoms originally present.

The method of the present invention may find utilization in numerous situations in the catalytic conversion of organic compounds. It is possible, for example, to activate a suitable crystalline aluminosilicate catalyst with a volatile metal halide only until a desired level of catalytic activity is achieved. Similarly a deactivated aluminosilicate catalyst suitable for the activation of the present invention, may be rejuvenated by treatment with a volatile metal halide until the desired level of activity is reached.

As mentioned above, the control of activity of crystalline aluminosilicate catalyst of the type specified for the present invention, may be achieved within a reactor, such as a fixed-bed reactor by passage of vapors of a volatile metal halide over the catalyst. The activity component as mentioned above may also be dissolved in a solvent and passed over the catalyst, either in liquid or vapor form. The solvent may suitably be the charge stock in the catalytic operation. It may be found advantageous in commercial units employing the present invention to provide continuously activation by volatile metal halide contact, substantially at the operating temperature of the catalyst.

As hereinabove mentioned, the silica to alumina ratio of the crystalline aluminosilicate employed in the present catalyst should be above 1.8 and most preferably it is about about 2.8.

It will be evident from the foregoing examples that crystalline aluminosilicates comprising cations selected from the group consisting of hydrogen and hydrogen precursor ions, when activated with a volatile metal halide, become vastly improved catalytic components. When used in chemical conversion of organic compounds, catalytically convertible in the presence of acidic catalyst sites, the present activated crystalline aluminosilicate catalysts exhibit activity unexpectedly superior to that of their unactivated counterparts.

It will be understood that the above description is merely illustrative of preferred embodiments of the invention. Additional modifications and improvements utilizing the discoveries of the present invention can be readily anticipated from the present discovery by those skilled in the art, and such modifications and improvements may fairly be presumed to be within the scope and purview of the invention as defined by the claims that follow.

We claim:

1. A method for effecting transformation of organic compounds, catalytically convertible in the presence of acidic catalyst sites, which comprises contacting the same under conversion conditions with a catalyst of a crystalline aluminosilicate comprising cations selected from the group consisting of hydrogen and hydrogen precursor ions, which has undergone contact prior to completion of said transformation with a volatile metal halide selected from the group consisting of metal chloride, metal bromide, metal iodide and mixtures thereof, present in an amount sufficient effectively to enhance the activity of said catalyst, which crystalline aluminosilicate has rigid three-dimensional networks made up of unit cells characterized by the substantial absence of change in unit cell dimensions upon dehydration and rehydration and by a uniform pore structure.

2. The method of claim 1 wherein the cations are hydrogen ions.

3. The method of claim 1 wherein the cations are ammonium ions.

4. The method of claim 1 wherein the volatile metal halide is aluminum chloride.

5. The method of claim 1 wherein the volatile metal halide is titanium tetrachloride.

6. The method of claim 1 wherein the volatile metal halide is ferric chloride.

7. A method for effecting transformation of organic compounds, catalytically convertible in the presence of acidic catalyst sites, which comprises contacting the same under conversion conditions with a catalyst consisting essentially of a crystalline aluminosilicate in finely divided form and a binder therefor, which catalyst has undergone contact prior to completion of said transformation with a volatile metal halide selected from the group consisting of metal chloride, metal bromide, metal iodide and mixtures thereof, present in an amount sufficient effectively to enhance the activity of said catalyst, the aluminosilicate of which comprising cations selected from the group consisting of hydrogen and hydrogen precursor ions, and having rigid three-dimensional networks made up of unit cells characterized by the substantial absence of change in unit cell dimensions upon dehydration and rehydration and by a uniform pore structure.

8. A method for effecting transformation of organic compounds, catalytically convertible in the presence of acidic catalyst sites, which comprises contacting the same under conversion conditions with a catalyst consisting essentially of a crystalline aluminosilicate contained in an inorganic oxide gel matrix, which catalyst has undergone contact prior to completion of said transformation with a volatile metal halide selected from the group consisting of metal chloride, metal bromide, metal iodide and mixtures thereof, present in an amount sufficient effectively to enhance the activity of said catalyst, the aluminosilicate component of which comprising cations selected from the group consisting of hydrogen and hydrogen precursor ions and having rigid three-dimensional networks made up of unit cells characterized by the substantial absence of change in unit cell dimensions upon dehydration and rehydration and by a uniform pore structure.

9. A method for effecting transformation of organic compounds, catalytically convertible in the presence of acidic catalyst sites, which comprises contacting the same under conversion conditions with a catalyst comprising a crystalline aluminosilicate, which catalyst has undergone contact prior to completion of said transformation with a volatile metal halide selected from the group consisting of metal chloride, metal bromide, metal iodide and mixtures thereof, present in an amount sufficient effectively to enhance the activity of said catalyst, said crystalline aluminosilicate comprising cations selected from the group consisting of hydrogen and hydrogen precursor ions.

10. A method for cracking a hydrocarbon charge which comprises contacting the same under catalytic cracking conditions with a catalyst of a crystalline aluminosilicate comprising cations selected from the group consisting of hydrogen and hydrogen precursor ions, which crystalline aluminosilicate has undergone contact prior to completion of said cracking with a volatile metal halide selected from the group consisting of metal chloride, metal bromide, metal iodide and mixtures thereof present in an amount sufficient effectively to enhance the activity of said catalyst.

11. The method of claim 10 wherein the cations are hydrogen ions.

12. The method of claim 10 wherein the cations are ammonium ions.

13. The method of claim 10 wherein the volatile metal halide is aluminum chloride.

14. The method of claim 10 wherein the volatile metal halide is titanium tetrachloride.

15. The method of claim 10 wherein the volatile metal halide is ferric chloride.

16. A method for cracking a normally paraffinic hydrocarbon, having a carbon chain of from 5 to 30 carbon atoms, which comprises contacting the same under catalytic cracking conditions with a catalyst of a crystalline aluminosilicate having a silica to alumina mole ratio of at least 1.8 and comprising cations selected from the group consisting of hydrogen and hydrogen precursor ions, which crystalline aluminosilicate has undergone contact prior to completion of said cracking with a volatile metal halide selected from the group consisting of metal chloride, metal bromide, metal iodide and mixtures thereof, present in an amount sufficient effectively to enhance the activity of said catalyst, which crystalline aluminosilicate has rigid three-dimensional networks made up of unit cells characterized by the substantial absence of change in unit cell dimensions upon dehydration and rehydration and by a uniform pore structure.

17. A method for effecting transformation of organic compounds, catalytically convertible in the presence of acidic catalyst sites, which comprises contacting the same under conversion conditions with a catalyst selected from the group consisting of hydrogen- and hydrogen precursor-containing aluminosilicates, having a silica to alumina mole ratio of at least 1.8, which catalyst has undergone contact prior to completion of said transformation with a volatile metal halide selected from the group consisting of metal chloride, metal bromide, metal iodide and mixtures thereof, present in an amount sufficient effectively to enhance the activity of said catalyst, which crystalline aluminosilicate has rigid three-dimensional networks made up of unit cells characterized by the substantial absence of change in unit cell dimensions upon dehydration and rehydration and by a uniform pore structure.

18. A method for effecting transformation of organic compounds, catalytically convertible in the presence of acidic catalyst sites, which comprises contacting the same under conversion conditions with a catalyst of at least one crystalline aluminosilicate selected from the group consisting of X-type zeolites, Y-type zeolites, T-type zeolites, L-type zeolites, W-type zeolites, ZK-type zeolites, mordenite and chabazite, said crystalline aluminosilicate comprising cations selected from the group consisting of hydrogen and hydrogen precursor ions, which catalyst has undergone contact prior to completion of said transformation with a volatile metal halide selected from the group consisting of metal chloride, metal bromide, metal iodide and mixtures thereof, present in an amount sufficient effectively to enhance the activity of said catalyst.

19. A method for effecting transformation of organic compounds, catalytically convertible in the presence of acidic catalyst sites, which comprises contacting the same under conversion conditions with a catalyst of a crystalline aluminosilicate having pores normally incapable of penetration by said organic compounds and comprising cations selected from the group consisting of hydrogen and hydrogen precursor ions, which catalyst has undergone contact prior to completion of said transformation with a volatile metal halide selected from the group consisting of metal chloride, metal bromide, metal iodide and mixtures thereof, present in an amount sufficient effectively to enhance the activity of said catalyst, which crystalline aluminosilicate has rigid three-dimensional networks made up of unit cells characterized by the substantial absence of change in unit cell dimensions upon dehydration and rehydration and by a uniform pore structure made up of pores of between about 3 and about 5 angstrom units in diameter.

20. A method for effecting transformation of organic compounds, catalytically convertible in the presence of acidic catalyst sites, which comprises contacting the same under conversion conditions with a catalyst of a crystalline aluminosilicate having a silica to alumina mole ratio of at least 1.8 and comprising cations selected from the group consisting of hydrogen and hydrogen precursor ions, which catalyst has undergone pretreatment with a volatile metal halide selected from the group consisting of metal chloride, metal bromide, metal iodide and mixtures thereof, in an amount sufficient effectively to enhance the activity of said catalyst, which crystalline aluminosilicate has rigid three-dimensional networks made up of unit cells characterized by the substantial absence of change in unit cell dimensions upon dehydration and rehydration and by a uniform pore structure.

21. A method for effecting transformation of organic compounds, catalytically convertible in the presence of acidic catalyst sites, which comprises passing the same through a reaction zone containing a catalyst of a crystalline aluminosilicate having a silica to alumina mole ratio of at least 1.8 and comprising cations selected from the group consisting of hydrogen and hydrogen precursor ions, said zone maintained under conversion conditions; introducing into and maintaining during transformation in said reaction zone a volatile metal halide selected from the group consisting of metal chloride, metal bromide, metal iodide and mixtures thereof, in an amount sufficient effectively to enhance the activity of said catalyst, which crystalline aluminosilicate has rigid three-dimensional networks made up of unit cells characterized by the substantial absence of change in unit cell dimensions upon dehydration and rehydration and by a uniform pore structure.

References Cited
UNITED STATES PATENTS

| | | | |
|---|---|---|---|
| 2,623,009 | 12/1952 | Kearby | 208—117 |
| 2,786,086 | 3/1957 | Gitterman | 208—116 |
| 2,859,174 | 11/1958 | Adams et al. | 208—116 |
| 3,140,249 | 7/1964 | Plank et al. | 208—120 |
| 3,159,564 | 12/1964 | Kelley et al. | 208—59 |

DELBERT E. GANTZ, *Primary Examiner.*

ABRAHAM RIMENS, *Examiner.*